United States Patent Office 2,852,771
Patented Sept. 16, 1958

2,852,771

TEST CIRCUIT FOR FREQUENCY MODULATION CANCELLER

Abraham E. Ruvin, North Massapequa, N. Y., assignor to the United States of America as represented by the Secretary of the Air Force Application July 18, 1957, Serial No. 672,847

5 Claims. (Cl. 343—17.7)

The purpose of this invention is to provide an integral test facility for the frequency modulation cancellation circuit of an MTI (moving target indication) radar system.

As is well known, the frequency of the echo from a target having radial velocity relative to the radar transmitter differs from the frequency of the transmitted pulse due to the Doppler effect, whereas the frequency of the echo from a target having no radial velocity shows no change. If the echo pulses received from both stationary and moving targets are applied to a receiver along with the transmitted frequency, or if, as in practical systems, the echo pulses with their frequencies reduced by beating with a local oscillator are applied to the receiver along with a continuous wave reference signal derived from a coherent oscillator locked in phase with the transmitted frequency similarly reduced by beating with the same local oscillator, in the resulting video output of the receiver, called the coherent video, successive echo pulses representing a stationary target do not vary in amplitude whereas successive pulse representing a moving target vary in amplitude at the Doppler frequency. MTI radar systems take advantage of this fact to distinguish the echoes of stationary and moving targets and, in most systems, to eliminate the fixed target echoes from the coherent video signal so that the remaining video signal represents only targets having radial motion relative to the transmitter. When such a signal is applied to a plan position indicator (P. P. I.) only moving targets are displayed.

The elimination of the stationary target echoes from the coherent video signal is the function of the cancellation circuit. This is accomplished by comparing the amplitude of each echo signal with the amplitude of the next succeeding echo signal from the same target and producing an output only when the two amplitudes are unequal. This comparison may be made directly on the basis of amplitude or, as in the cancellation circuit to which this invention relates, the coherent video amplitudes may be used to frequency modulate a high frequency wave and the comparison made on the basis of frequency, a frequency deviation away from a predetermined reference frequency being produced whenever the frequencies representing successive echoes differ. These deviations are detected by a discriminator the output of which represents moving targets only and is referred to as the MTI video.

The success of an MTI radar system of the above type in displaying only moving targets depends upon the efficiency of the cancellation circuit, which preferably should have a cancellation ratio of the order of —40 db. The integral test facility in accordance with the invention provides a simple means for relating the actual video cancellation to a known attenuation of the signal thus indicating the effectiveness of the cancellation circuit.

The invention will be described in more detail in connection with the specific embodiment thereof shown in the accompanying drawing, in which Fig. 1 is a diagram of a frequency modulation canceller embodying the test circuit.

Figure 1:
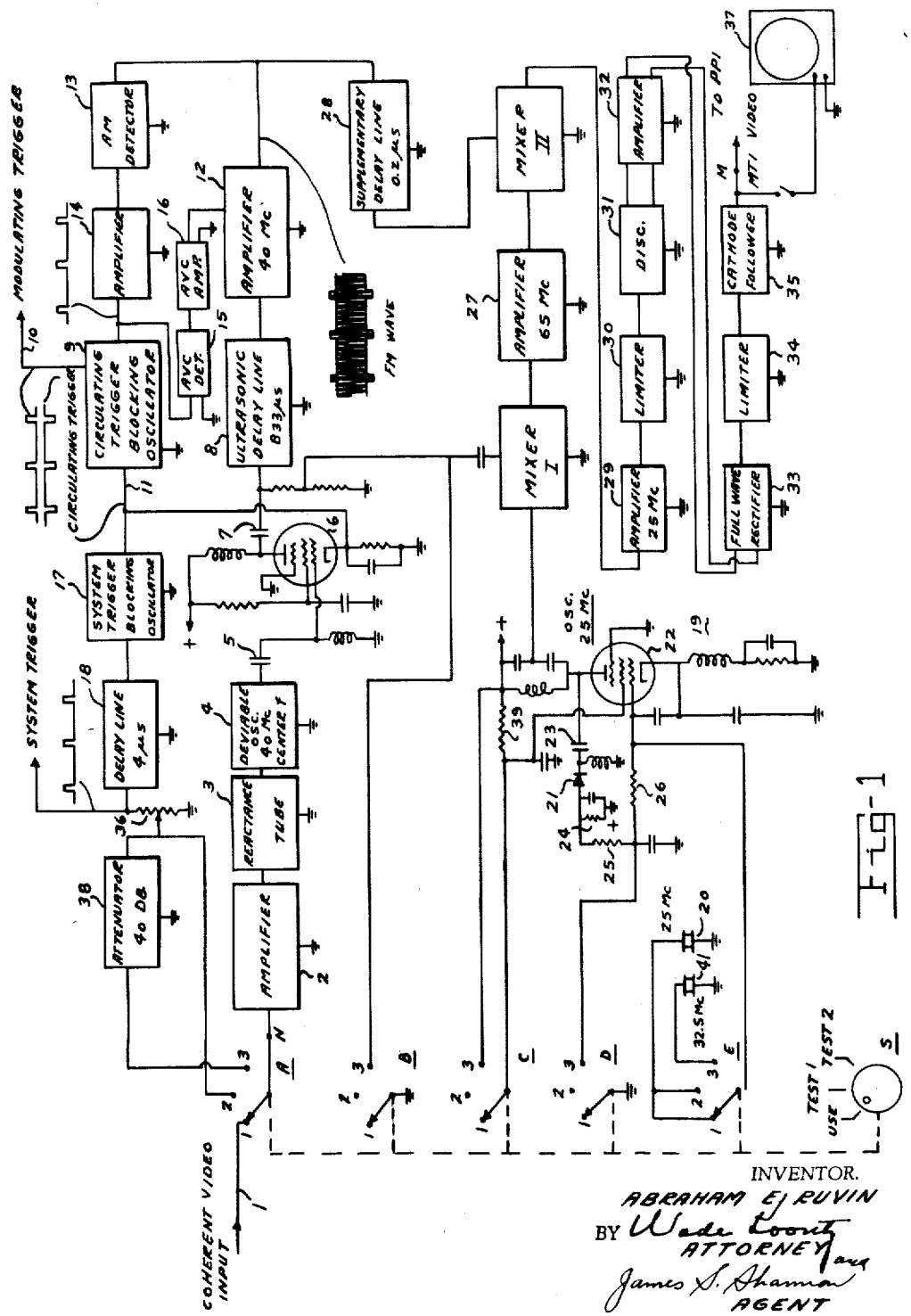

Referring to Fig. 1, the FM cancellation circuit will be described prior to a description of the test circuit. For normal use switch S, having contact banks A—E, is in the Use position in which position the coherent video signal, supplied over line 1 from the receiver of the MTI radar system, is applied through contact $A_1$ to video amplifier 2 and after amplification to reactance tube 3. Reactance tube 3 cooperates with deviable oscillator 4, having a center frequency of 40 mc./s., to change the tuning of this oscillator and thus shift its frequency away from the center frequency by an amount proportional to the amplitude of the video signal. Since the coherent video signal is bipolar, this shift may occur in either direction. The output of oscillator 4, therefore, is frequency modulated in accordance with the amplitude of the coherent video signal. This FM signal is applied through condenser 5 to the control grid of line driver tube 6 the output of which is coupled through condenser 7 to ultrasonic delay line 8.

The cancellation circuit of Fig. 1 controls the PRF (pulse repetition frequency) of the radar transmitter and the synchronization of other parts of the MTI radar system, such as the display, by the generation of a modulating trigger and a system trigger. It is appropriate to explain these functions before continuing with the cancellation function. The circulating trigger blocking oscillator 9 is a free running blocking oscillator designed to run at the PRF which, in this case, is 1200 c./s. The oscillator generates two coincident series of 1 microsecond pulses, one positive and the other negative. The positive series appears on output line 10 and serves as the modulating trigger for the transmitter. The negative series, termed the recirculating trigger, appears on output line 11 and serves to stabilize the frequency of the blocking oscillator in the following manner: The circulating trigger is applied to the cathode of driver tube 6 which now acts as an amplitude modulator of the FM wave applied to its control grid. The wave applied to the delay line 8, therefore, is frequency modulated in accordance with the amplitude of the coherent video and amplitude modulated by the circulating trigger. The general form of this wave is as illustrated in the output of amplifier 12. The wave is amplitude detected by detector 13 to recover the pulse modulation which, after amplification in 14, is applied to blocking oscillator 9 as a synchronizing pulse. The operation of this oscillator is therefore stabilized at a pulse repetition interval equal to the delay produced by line 8 plus the delays introduced by elements 12, 13, 14 and oscillator 9. For a PRF of 1200 c./s. the latter delays are insignificant so that the delay of the line is made substantially equal to the pulse repetition interval, in this case 833+ microseconds. In order to maintain a high degree of stability for the pulse repetition interval, steps are taken to keep the circulating trigger pulses applied to the blocking oscillator 9 at a constant amplitude level. This is accomplished by an automatic volume control circuit, comprising peak detector 15 and amplifier 16, which acts to control the gain of amplifier 12 in such manner as to keep the pulse amplitude at the input to blocking oscillator 9 constant.

The circulating trigger is also used to trigger blocking oscillator 17 which generates the system trigger. It is usually necessary that the system trigger be slightly delayed relative to the modulating trigger and this is accomplished by 4 microsecond delay line 18. Delay line 18 is taken advantage of in the cancellation test circuit as will be explained later.

Returning now to the cancellation function of the circuit of Fig. 1, the FM wave at the input to delay line 8 is also applied to mixer I along with a 25 mc. wave from fixed reference frequency oscillator 19. The frequency of this oscillator is accurately controlled by crystal 20 and the amplitude of its output is held constant by an automatic gain control circuit comprising rectifier 21 which is coupled to the anode of tube 22 by means of condenser 23 and produces a negative voltage across resistor 24 proportional to the oscillator output. This AGC voltage is applied through resistors 25 and 26 to the control grid of tube 22 to maintain the oscillator output constant. The sum frequency is selected from the output of mixer 1 by band-pass amplifier 27 which has a center frequency of 65 mc./s. The output of amplifier 27 beats in mixer II with the output of amplifier 12, delayed slightly by supplemental delay line 28, and the difference frequency is selected by the 25 mc./s. center frequency band-pass amplifier 29.

Supplemental delay line is necessary to insure that the frequencies representing successive returns from a given target are applied to mixer II during exactly the same interval. To satisfy this requirement, the sum of the delays produced by elements 8, 12 and 28 less the delays introduced by mixer I and amplifier 27 must equal exactly one pulse repetition interval. Since, as already pointed out, the pulse repetition interval exceeds the delay of elements 8 and 12 by the delays produced by elements 13, 14 and 9, it follows that the delay introduced by supplemental delay line 28 should equal the sum of the delays produced by elements 13, 14, 9, mixer I and 27. In the example shown this amounts to 0.2 microsecond.

Considering the operation of the cancellation circuit thus far described, if the coherent video input amplitude is zero a 40 mc./s. wave from oscillator 4 is applied to delay line 8 and mixer I. The 65 mc./s. beat frequency selected from the output of mixer I by selective amplifier 27 beats with the delayed 40 mc./s. wave in mixer II, the resulting 25 mc./s. difference frequency being selected by amplifier 29. This wave, after having its amplitude modulation removed by limiter 30, is applied to discriminator 31 which is designed to have its center frequency and zero output at 25 mc./s. Therefore, the output at discriminator 31 is zero when the coherent video amplitude is zero, i. e. in the absence of targets either stationary or moving.

In the case of a stationary target successive returns from the same target have the same amplitude, as formerly stated. Therefore, successive returns will produce equal frequency deviations from oscillator 4, the magnitude of the deviation being determined by the coherent video pulse amplitude. In the presence of equal successive deviations the output of amplifier 27 remains at 25 mc./s. and the output of discriminator 31 remains at zero, assuming perfect cancellation, since the frequencies simultaneously applied to mixer II are equally deviated and their difference is unchanged.

In the case of a moving target successive returns from a given target do not have the same amplitude since the amplitude varies at the Doppler frequency. Therefore, the frequencies simultaneously applied to mixer II are not deviated by equal amounts and the output of amplifier 29 differs from 25 mc./s. Consequently, an output occurs from discriminator 31 in the presence of a moving target.

The output of discriminator 31 is bipolar whereas a unipolar output is desired for application to the P. P. I. After amplification in amplifier 32 conversion to a unipolar signal is accomplished by full wave rectifier 33. A limiter 34 may be used to set the maximum amplitude of the MTI video signal and a cathode follower 35 may be employed as an impedance changing device in applying the MTI video signal to the P. P. I. transmission line.

In an FM cancellation circuit amplitude balance is not required. This leaves temporal balance as the principal factor influencing the effectiveness of cancellation. Temporal balance exists when the frequencies representing successive returns from a given target are applied to mixer II at exactly the same time. Temporal balance may be affected by changes in the delay introduced by any of elements 9, 13, 14, 27, 28 and mixer I but is not affected by changes in the delays introduced by elements 8 and 12 since these delays are common to the circulating trigger and cancellation loops and changes therein affect the pulse repetition and cancellation intervals equally. When the temporal balance is destroyed cancellation of stationary targets is not complete and a residual signal appears in the video output of the cancellation circuit. The residual signal due to temporal unbalance usually occurs at the leading and trailing edges of the echo pulse and is due to the fact that the frequencies representing the successive returns do not start and stop at mixer II at the same time. This results in a short interval at each end of the echo pulse when only one of these frequencies is present in the mixer, giving rise to other than a 25 mc./s. output from amplifier 29 during these short intervals. Other factors, including the frequency of oscillators 4 and 19 and the alignment of discriminator 31, can result in less than complete cancellation of stationary target returns and give rise to residual signals in the output video.

In view of the above possibilities for errors in cancellation it is desirable to have a simple tester incorporated in the cancellation circuit so that the operation of this circuit can be easily checked at frequent intervals. In the embodiment shown in Fig. 1 the testing circuit introduces an artificial stationary target signal, derived from the system trigger, into the cancellation circuit and measures the amplitude of the residual signal. The same target signal is then attenuated by an amount corresponding to the desired degree of cancellation, for example 40 db, and the cancellation function of the circuit nullified by fixing the output of amplifier 27 at 65 mc./s. The amplitude of the residual signal previously measured is then compared with the amplitude of the resulting MTI video signal, equality indicating a cancellation ratio of 40 db.

The artificial target signal is derived from the system trigger output of delay line 18 by means of level adjusting device 36. This signal is a series of constant amplitude pulses occurring at the PRF and therefore simulates the return from a stationary target. Had the delayed system trigger not been available, the target signal could just as well have been obtained by delaying either the circulating or the modulating triggers. The cancellation test is performed by measuring the amplitude of the output at terminal M with switch S in the Test 1 position and comparing this amplitude with the amplitude obtained at terminal M in the Test 2 position.

Figure 2:
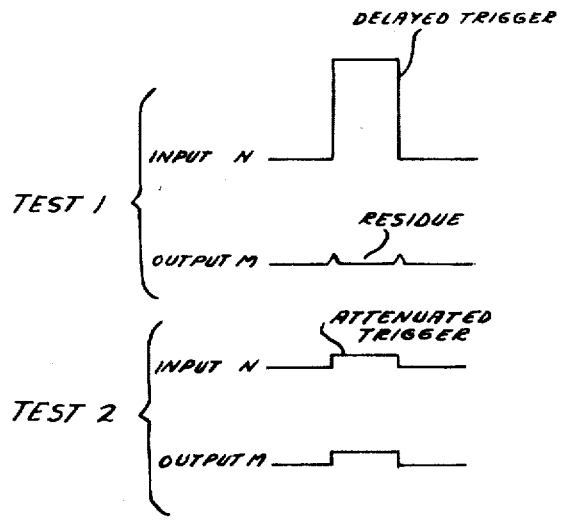
Fig. 2 illustrates the waveforms obtained in the test operation.

In the Test 1 position, the constant amplitude pulses from level adjustment device 36 are applied to the coherent video input terminal N of the cancellation circuit through contact A2. The residue of the cancelled signal can then be observed and measured at terminal M as by oscilloscope 37. This residue may appear as shown in Fig. 2.

In the Test 2 position of switch S, the same artificial target signal but attenuated 40 db by attenuator 38 is applied to input terminal N through contact A3; the input to mixer I from the output of driver tube 6 is blocked by grounding this input at contact B3; and 32.5 mc./s. crystal 41 is substituted for 25 mc./s. crystal 20 at contact E3. Under the last condition oscillator 19 supplies a frequency of 32.5 mc./s. to mixer I, the second harmonic of which is selected from the output of the mixer by amplifier 27. Consequently, in the Test 2 position, the frequency supplied to mixer II by amplifier 27 is fixed at 65 mc./s. so that no cancellation of the attenuated signal takes place. Since, in this test position, the known attenuation of attenuator 38 is in effect substituted for the unknown amplitude reduction accomplished by the cancellation circuit, the ratio of the residue amplitude at terminal M in the Test 1 position to the video output level at this terminal in the Test 2 position is a measure of the cancellation ratio relative to the known attenuation, in this case 40 db. If the ratio of these signals is unity, the cancellation ratio is −40 db; if 2, the cancellation ratio is −34 db; if ½, the cancellation ratio is −46 db; etc.

Figure 3:
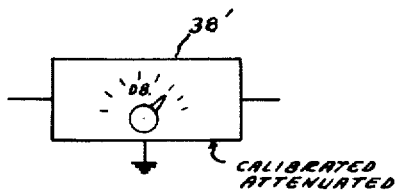
Fig. 3 illustrates a modification of Fig. 1.

In an alternative arrangement, a calibrated attenuator 38', as shown in Fig. 3, may be substituted for fixed attenuator 38 of Fig. 1. In this case, attenuator 38' is adjusted during Test 2 until the video amplitude at terminal M equals the residue amplitude obtained at this terminal in Test 1. The indicator on attenuator 38' then reads the cancellation ratio directly.

Returning briefly to oscillator 19, the 32.5 mc./s. frequency is used rather than 65 mc./s. because of the difficulty in getting good performance at 65 mc./s. from a crystal oscillator whose parameters are set for 25 mc./s. In order to obtain sufficient output from oscillator 19 in the Test 2 position, the automatic gain control voltage is removed by grounding the lower end of resistor 25 at contact D3 and the screen grid potential is raised by shorting series screen resistor 39 at contact C3.

I claim:

1. In combination with a cancellation circuit for an MTI radar system of the type radiating short pulses of high frequency energy at a constant pulse repetition interval, said cancellation circuit having an input circuit and an output circuit and being operative to cancel from its output each video echo signal applied to its input that has the same amplitude as the next preceding echo from the same target, a test circuit comprising means for producing an artificial stationary target signal consisting of a series of constant amplitude video pulses separated by said pulse repetition interval, means operative during a first condition of said test circuit for applying said artificial target signal to the input circuit of said cancellation circuit, means operative during a second condition of said test circuit for attenuating said artificial target signal a predetermined amount, for applying said attenuated signal to the input circuit of said cancellation circuit, and for disabling the cancellation function of said cancelling circuit, and means for comparing the amplitudes of the signals occuring at the output terminal of said cancellation circuit in said first and second conditions.

2. In combination with a cancellation circuit for an MTI radar system of the type radiating short pulses of high frequency energy at a constant pulse repetition interval, said cancellation circuit having an input terminal, an output terminal and, connected between said terminals, two parallel paths having delays that differ by said pulse repetition interval for comparing successive video echo signals from a given target applied to said input terminal, a test circuit comprising means for producing an artificial stationary target signal consisting of a series of constant amplitude video pulses separated by said pulse repetition interval, means operative during a first condition of said test circuit for applying said artificial target signal to the input terminal of said cancellation circuit, means operative during a second condition of said test circuit for attenuating said artificial target signal a predetermined amount, for applying said attenuated signal to the input terminal of said cancellation circuit, and for disabling the pulse comparing function of one of said parallel paths, and means for comparing the amplitudes of the signals occurring at the output terminal of said cancellation circuit in said first and second conditions.

3. In combination with a cancellation circuit for an MTI radar system of the type radiating short pulses of high frequency energy at a constant pulse repetition intervals, said cancellation circuit comprising: an input circuit for receiving a coherent video signal representing both stationary and moving targets, means coupled to said input circuit for producing a wave frequency modulated in accordance with the amplitude of said video signal, means for generating a fixed reference frequency, a first mixer, means for applying said frequency modulated wave and said reference frequency to said first mixer, a second mixer, first band pass means for selecting one of the sum and difference bands of frequencies in the output of said first mixer and applying same to said second mixer, delay means for applying said frequency modulated wave to said second mixer said delay means delaying the application of said frequency modulated wave to said second mixer relative to its application to said first mixer by an interval equal to said pulse repetition interval, second band pass means for selecting from the sum and difference bands of frequencies in the output of said second mixer the band including said reference frequency, and means receiving the output from said second band pass means and operating to convert deviations in said output from said reference frequency into a video signal of proportionate amplitude, said video signal constituting the output of said cancellation circuit, a test circuit comprising means for producing an artificial stationary target signal consisting of a series of constant amplitude video pulses separated by said pulse repetition interval, means operative during a first condition of said test circuit for applying said artificial target signal to the input circuit of said cancellation circuit, means operative during a second condition of said test circuit for attenuating said artificial target signal a predetermined amount, for applying said attenuated signal to the input circuit of said cancellation circuit, for blocking the application of said frequency modulated wave to said first mixer and for changing the frequency of said reference frequency generator so that the frequency of the output of said second band pass means is that corresponding to the absence of a video input to the cancellation circuit when operating normally, and means for comparing the amplitudes of the outputs of said cancellation circuit in said first and second conditions.

4. A cancellation circuit and integral test circuit for an MTI radar system of the type radiating short pulses of high frequency energy at a constant pulse repetition interval comprising: an input circuit for receiving an uncancelled video signal; a deviable oscillator having a center frequency F1; means coupled to said input circuit and said oscillator for shifting the frequency of said oscillator from the value F1 by an amount proportional to the amplitude of said uncancelled video signal thus producing a frequency modulated wave; an amplitude modulator; means for applying said frequency modulated wave to said amplitude modulator; a circulating trigger pulse generator for producing a series of short trigger pulses separated by the desired pulse repetition interval of said MTI radar system; means applying said circulating trigger pulses to said amplitude modulator for amplitude modulating said frequency modulated wave; a delay line producing a delay substantially equal to said pulse repetition interval; means for applying the output of said amplitude modulator to the input of said delay line; means coupled to the output of said delay line for detecting the amplitude modulations of said frequency modulated wave; means for applying the output of said detector to said circulating trigger pulse generator for synchronizing its operation; means for generating a fixed reference frequency F2; a first mixer; means for applying said reference frequency F2 and said frequency modulated wave at the output of said amplitude modulator to said first mixer; a second mixer; first band pass means for selecting one of the sum and difference bands of frequencies in the output of said first mixer and applying same to said second mixer; a circuit including said delay line for applying said frequency modulated wave at the output of said amplitude modulator to said second mixer, said circuit delaying the application of said frequency modulated wave to said second mixer relative to its application to said first mixer by an interval equal to said pulse repetition interval; second band pass means for selecting from the sum and difference bands of frequencies in the output of said second mixer the band including the reference frequency F2; means receiving the output from said second band pass means and operating to convert deviations in said output from the reference frequency F2 into a video signal of proportionate amplitude, said video signal constituting the output of said cancellation circuit; means for deriving from said circulating trigger pulses an artificial stationary target signal identical to said circulating trigger pulses but delayed relative thereto by a fraction of said pulse repetition interval; a three position test switch having a first normal operation position and second and third test positions; means operative in the first position of said switch for applying the uncancelled video signal from said MTI radar to said input circuit; means operative in the second position of said switch for applying said artificial target signal to said input circuit; means operative in the third position of said switch for attenuating said artificial target signal a predetermined amount, for applying said attenuated signal to said input circuit, for blocking the application of said frequency modulated wave to said first mixer and for changing the frequency of said reference frequency generator so that the frequency of the output of said second band pass means is the same as obtained in the first position of said test switch when the frequency of said deviable oscillator is F1; and means for comparing the amplitudes of the outputs of said cancellation circuits in the second and third positions of said test switch.

5. Apparatus as claimed in claim 4 in which said reference frequency generating means is an oscillator controlled by a piezoelectric resonator of frequency F2 and comprises an electron tube having a control grid and a screen grid, means for applying an automatic gain control voltage to said control grid for maintaining constant output from said generator when operating at F2, and a voltage dropping resistor in series with said screen grid, and in which said means operative in the third position of said switch for changing the frequency of said reference frequency generator substitutes a piezoelectric resonator of frequency $$\frac{F1+F2}{2}$$

for said resonator of frequency F2, short circuits said screen grid series resistor and removes said automatic gain control voltage from said control grid.

No references cited.